E. S. LAMMERS, Jr.
CONTROL SYSTEM.
APPLICATION FILED MAR. 8, 1919.

1,411,041. Patented Mar. 28, 1922.

WITNESSES:
J. A. Helsel.
David Rines

INVENTOR
Edwin S. Lammers, Jr.
BY
Wesley G. Carr
ATTORNEY

UNITED STATES PATENT OFFICE.

EDWIN S. LAMMERS, JR., OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,411,041.   Specification of Letters Patent.   Patented Mar. 28, 1922.

Application filed March 8, 1919. Serial No. 281,526.

*To all whom it may concern:*

Be it known that I, EDWIN S. LAMMERS, Jr., a citizen of the United States, and a resident of Wilkinsburg, in the county of Allegheny and State of Pennsylvania, have invented a new and useful Improvement in Control Systems, of which the following is a specification.

My invention relates to control systems and particularly to systems for the control of motors and generators.

In systems embodying motors and generators, such as are commonly employed, the generator field is excited in order to increase the voltage of the generator which supplies current to drive the motor. When it is desired to stop the motor, the field excitation of the generator is reduced. The motor then operates as a generator and the energy derived from the inertia of the rotating motor armature operates the generator as a motor.

If the current traversing the armature circuit exceeds a predetermined value, a circuit breaker may be operated to disconnect the motor from the generator, thereby avoiding injury to the machines. If the circuit breaker happens to be reclosed before the motor comes to rest, or, at least, to a very low speed, a large rush of current traverses the generator armature because the voltage of the generator is, at this time, relatively low or zero.

The object of my invention is to provide a control system which shall be free from the above-mentioned defect.

According to my invention, the circuit of the armatures is closed by a circuit breaker which is automatically released when the current traversing the circuit becomes excessive. Means are provided for preventing the reclosing of the circuit breaker so long as the current continues to be excessive. A coil, which may be energized in accordance with the counter-electromotive force of the motor, may be utilized to actuate a latch into engagement with the circuit breaker or to open a circuit ordinarily employed to close the circuit breaker or to perform some other function such that the circuit breaker shall be maintained in open position until the coil becomes practically de-energized. The circuit of the counter-electromotive force coil should preferably be broken as soon as the circuit breaker is closed, so as to prevent the energization of this coil, under normal conditions.

Figure 1:
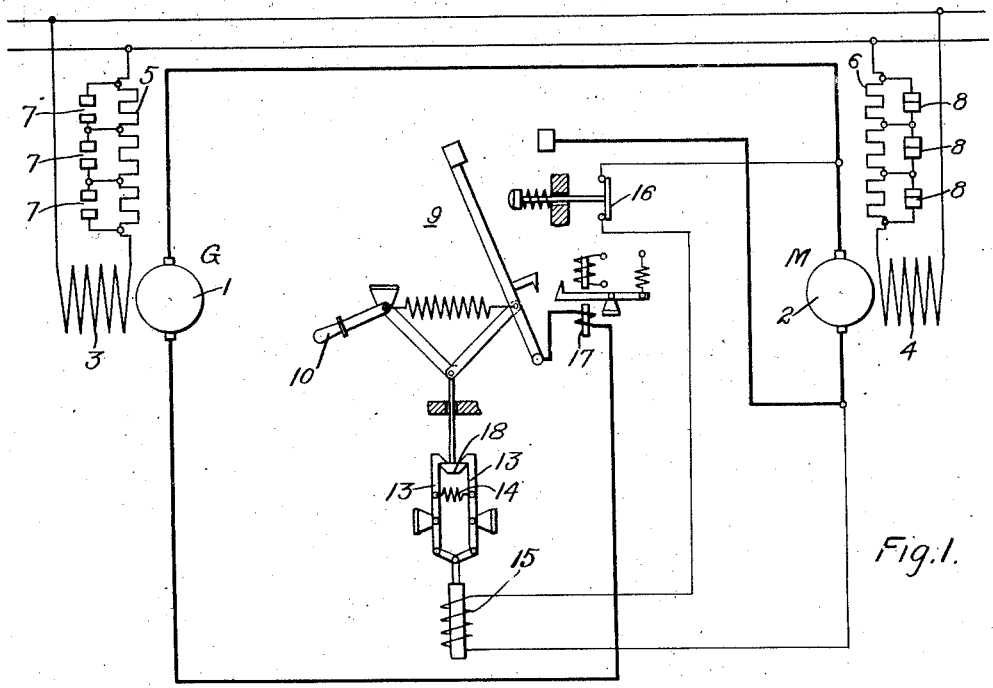
Figure 2:
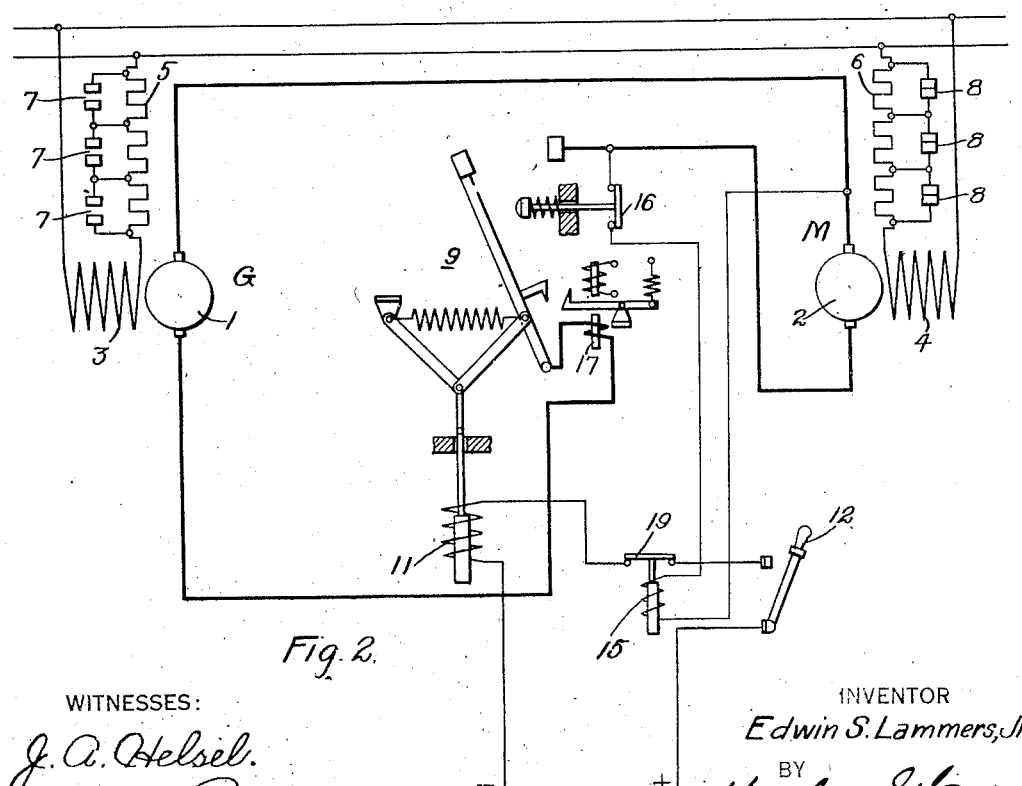

In the accompanying drawings, Figures 1 and 2 are diagrammatic views of circuits and apparatus embodying two forms of my invention which have been chosen for purposes of illustration.

A generator G and a motor M are respectively provided with armatures 1 and 2 and separately excited field-magnet windings 3 and 4 respectively having resistors 5 and 6 in series therewith. Any other suitable method of exciting the generator and the motor may be employed. The resistors 5 and 6 may be controlled by switches 7 and 8, the former of which are adapted to be successively closed and the latter successively opened for acceleration purposes, and to be operated in the reverse order for purposes of deceleration. A circuit breaker 9 may be employed to connect the armatures 1 and 2 in a closed circuit. The circuit breaker may be of any ordinary and well known form, such as that which is diagrammatically illustrated in the drawings, that shown in Fig. 1 being adapted to be closed by the handle 10, and that in Fig. 2 by a coil 11, which may be energized by a master switch 12.

The circuit breaker of Fig. 1 is supplied with a pair of latches 13, which are normally pressed outwardly by a compression spring 14. The force of the spring is adapted to be overcome by a coil 15, which is connected across the terminals of the armature 2 in series with a normally closed switch 16, which is adapted to be opened, in order to open the circuit of the coil 15, upon the closing of the circuit breaker 9. The switch 16 is not essential to the operation of my system, for the coil 15 may be permanently connected to the armature terminals. When the coil 15 is energized in accordance with the counter-electromotive force of the motor, it actuates the latches 13 into the illustrated position, in opposition to the force of the spring 14. In the event that the circuit breaker is opened by overload conditions, as by means of a coil 17, which is in the circuit of the armatures, the latches 13 will engage a catch member 18, which is mechanically connected to the circuit breaker 9, the latch members 13 thereupon being maintained in active engagement with the catch member 18 so long as the coil 15 remains energized by the counter-electromotive force of the motor.

The system of Fig. 2 differs somewhat from that shown in Fig. 1, the main difference residing in that the coil 15 controls a switch 19, which is adapted to open the circuit of the coil 11 and to maintain this circuit open so long as the counter-electromotive force of the motor is sufficiently large to energize the coil 15.

In operation, the circuit breaker 9 is closed and the switches 7 thereupon successively actuated to closed position to short-circuit the resistor 5. The field magnet winding 3 is thereupon increasingly excited, the voltage of the generator G is increased to a corresponding degree and a correspondingly increasing current is supplied to the motor M. The switches 8, which are normally closed, are thereupon successively opened in order to decrease the excitation of the winding 4, thereby further to accelerate the motor. When it is desired to decelerate the motor, the switches 8 and 7 are operated in the reverse sequence. The voltage of the generator G will thereupon be decreased. When the value of this voltage becomes less than that of the counter-electromotive force of the motor, the latter will operate as a generator and current will traverse the closed circuit comprising the motor and the generator armatures, in the reverse direction. If the voltage of the generator has a relatively low value, the reverse current in the circuit may become excessive, whereupon the coil 17 will become energized to a sufficiently high degree to cause the opening of the circuit breaker 9. The same effect will be obtained under predetermined conditions, upon the load becoming excessive, during acceleration or deceleration or during the normal operation of the machines. The switch 16, which was automatically opened at the time the circuit breaker 9 was closed, thereupon becomes automatically closed to connect the coil 15 in circuit across the motor terminals. In the system of Fig. 1, the latch members 13 are thereupon actuated to the closed, illustrated position to engage the catch member 18. The circuit breaker 9 cannot now be closed until the counter-electromotive force of the motor falls to a value sufficiently low to reduce the energization of the coil 15 so that the compression spring 14 will be empowered to move the latch members 13 out of engagement with the catch member 18. This will permit the closing of the circuit breaker 9 but, of course, not until the motor M has come nearly to rest. In the system of Fig. 2, the coil 15 will cause the opening of the switch 19 to break the circuit of the coil 11 so that operation of the master switch 12 will be ineffective to close the circuit breaker 9 until the motor speed falls to a sufficiently low value to permit the closing of the switch 19. As the switch 12 may be maintained in closed position, the circuit breaker 9 will automatically be reclosed as soon as the switch 19 becomes reclosed.

According to my invention, therefore, the closing of the circuit of the armatures is prevented until the motor speed has fallen to so low a value that connecting the armatures in series will produce no undesirable effects. I attain this result in a simple manner, with inexpensive apparatus.

It will be understood, of course, that my invention is not limited to the exact constructional forms herein illustrated, but is to be construed as broadly as is indicated in the annexed claims.

I claim as my invention:

1. The combination with a dynamo-electric machine, a switch for closing the circuit of said machine and means for preventing the closing of said switch, of means for normally rendering said preventing means inoperative, means for opening said switch when the current traversing said machine exceeds a predetermined value, and means operable, when the electromotive force of said machine exceeds a predetermined value, to render said preventing means operative.

2. The combination with a dynamo-electric machine, of a switch for closing the circuit of said machine, means for normally maintaining said switch open, means for closing said switch, normally inoperative means for preventing the closing of said switch, and means, operable, when the electromotive force of said machine exceeds a predetermined value, to render said preventing means operative.

3. The combination with a motor, of a switch for closing the circuit of said motor, normally inoperative means for preventing the closing of said switch, a coil energized by the counter-electromotive force of said motor for rendering said preventing means operative, and means controlled by said switch for rendering said coil ineffective.

4. The combination with a generator and a motor having armatures connected in series, said generator being adapted to supply energy to said motor, and said motor being adapted to supply energy to said generator, of a switch for closing the circuit of said armatures, means for opening said switch when the current traversing said armatures exceeds a predetermined value, and means for preventing the reclosing of said switch so long as the current traversing said motor exceeds a predetermined value.

5. The combination with a generator and a motor having armatures connected in series, means for energizing said generator to drive said motor and means whereby said motor may supply energy to said generator, of a circuit breaker for closing the circuit of said armatures, a latch for maintaining said circuit breaker open, means for normally maintaining said latch in ineffective position, and means controlled by the counter-electromotive force of said motor for maintaining said latch in effective position.

6. The combination with a motor and a generator having armatures connected in series, said generator being adapted to supply energy to said motor, and said motor being adapted to supply energy to said generator for dynamic braking, of a circuit breaker for closing the circuit of said armatures, an actuating coil for closing said circuit breaker, means for energizing said coil, and means controlled in accordance with the counter-electromotive force of said motor for maintaining said coil de-energized.

7. The combination with a motor and a generator having armatures connected in series, of a switch that is normally biased toward open position for closing the circuit of said armatures, a coil for actuating said switch to closed position, a switch for closing the circuit of said coil, a switch that is normally biased toward closed position, and means for actuating said last-named switch to open the circuit of said coil when the current traversing the circuit of said armatures exceeds a predetermined value.

8. The combination with a dynamo-electric machine and a switch for closing the circuit of said machine and having an actuating coil, of a master switch for closing the circuit of said coil, a switch for opening the circuit of said coil when the current traversing the circuit of said machine exceeds a predetermined value, said last-named switch being adapted to be automatically reclosed when the current traversing the circuit of said machine falls below said value, and means for preventing the closing of the first-named switch upon the closing of the last-named switch in case the electromotive force of said dynamo-electric machine exceeds a predetermined value.

In testimony whereof, I have hereunto subscribed my name this 26 day of Feb., 1919.

EDWIN S. LAMMERS, Jr.